United States Patent Office 3,479,147
Patented Nov. 18, 1969

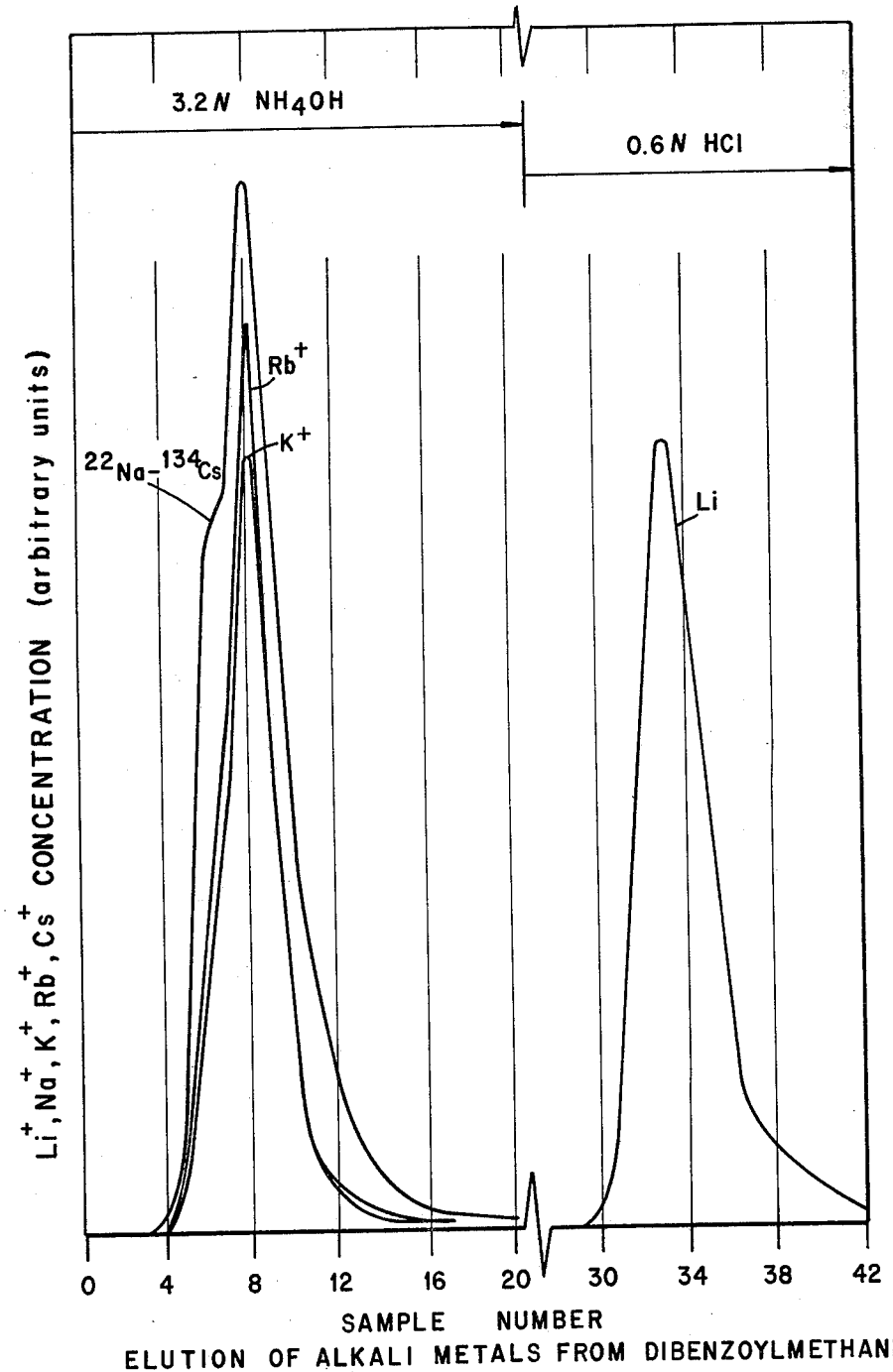

3,479,147
EXTRACTION OF LITHIUM VALUES
De Wayne A. Lee, Knoxville, Tenn., assignor to the United States of America as represented by the United States Atomic Energy Commission
Filed Nov. 22, 1966, Ser. No. 596,342
Int. Cl. B01d 11/04; C22b 27/00
U.S. Cl. 23—312
4 Claims

ABSTRACT OF THE DISCLOSURE

This invention is directed to a liquid-liquid extraction method of separating lithium values from other alkali metal values. In accordance with this method an alkaline aqueous phase containing lithium values together with other alkali metal values is contacted with an organic solvent containing a mixture of (1) a chelating agent selected from β-diketones and analogs thereof wherein the oxygen atoms in the β-diketones have been replaced with nitrogen, phosphorus, or sulfur atoms, and (2) a solvating ligand such as amines and organophosphorus compounds. This mixture preferentially extracts lithium values from the aqueous phase.

---

The invention described herein was made in the course of, or under, a contact with the U.S. Atomic Energy Commission.

This invention relates to methods of removing lithium values from aqueous solutions and of separating lithium values from other alkali metal values.

Liquid-liquid extraction methods of separating a mixture of metal values into its component values are highly useful, and such methods have been developed for separating lithium from other alkali metal values. However, these prior methods have suffered some disadvantage such as requiring a high ratio of volume of organic solution to volume of aqueous solution.

It is accordingly one object of my invention to provide an improved method of removing lithium values from an alkaline aqueous solution.

It is another object of my invention to provide an improved liquid-liquid extraction method for separating lithium values from other alkali metal values.

Other objects of my invention will become apparent from the following description and the appended claims.

In accordance with my invention I have provided a method of removing lithium values from an alkaline aqueous solution containing said lithium values comprising contacting said alkaline solution with an organic solution containing (1) a chelating agent selected from β-diketones and analogs thereof wherein the oxygen atoms in the β-diketones have been replaced with nitrogen, phosphorus, or sulfur atoms and (2) a Lewis base solvating ligand which is more basic than water.

My method may be used to remove lithium values from an aqueous solution containing no other alkali metal values, or it may be used to effect separation of lithium values from other alkali metal values. Excellent separation of lithium values from the alkali metal values is achieved by my method even with a relatively low ratio of volume of organic phase to volume of aqueous phase.

The attached drawing shows the elution curves for lithium and other alkali metals sorbed on a surface containing the extracting agent used in my separation method.

The aqueous solution may contain any alkali metal or any mixture of alkali metals in any concentration.

The pH of the aqueous solution will depend upon the concentration therein of alkali metal values. The pH may range from 11 for low concentrations of alkali metal values to 14 for high concentrations of alkali metal vaues.

The aqueous solution may contain any inorganic anions execpt those that form a precipitate with lithium.

The organic solution comprises (1) a solvent, (2) a β-diketone or an analog thereof as a chelating agent, and (3) a Lewis base solvating ligand which is more basic than water.

The organic solvent may be any aliphatic or aromatic organic liquid capable of dissolving the chelating agent and the solvating ligand. Typical of the useful solvents are the straight-chain hydrocarbons as represented by dodecane and n-octane and the aromatic hydrocarbons as represented by p-xylene and benzene.

The celating agent may be any β-diketone, i.e., any diketone whose ketone groups are separated by one carbon atom or any analogous compound having sulfur, phosphorus, or nitrogen atoms substituted for the oxygen atoms of the β-diketone. Typical of the useful chelating agents are dibenzoylmethane, trifluoroacetylacetone, dipivaloylmethane, acetylacetone, and the sulfur-, phosphorus-, or nitrogen-containing analogs of these compounds. The concentration of the chelating agent in the organic solvent must be great enough to provide two molecules of chelating agent per molecule of lithium extracted, and may suitably range up to 1 molar.

The third component of the organic phase is a Lewis base solvating ligand which is more basic than water. The preferred solvating ligand is one selected from the group consisting of amines and organophosphorus compounds represented by the formulas

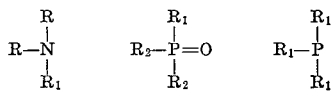

where R is selected from hydrogen, alkyl, and aryl radicals; $R_1$ is selected from alkyl and aryl radicals; and $R_2$ is selected from alkyl, aryl, alkoxy, aralkoxy radicals, and sulfur analogs of alkoxy and aralkoxy radicals.

Considering the amines, any primary, secondary, or tertiary amine capable or being dissolved in the organic solvent may be used as the solvating ligand. These amines may contain straight chains, branched chains, or aromatic groups. The lower limit of the number of carbon atoms in the molecule is about 10, while the upper limit is determined by the solubility of the amine in the organic solvent. Typical useful amines are decylamine, hexadecalamine, dilaurylamine, di-n-octylamine, dibenzylamine, tri-n-butylamine, tri-n-decylamine, and tri-isooctylamine.

The organic phosphorus compounds which may be used include the organic phosphates, phosphonates, phosphinates, phosphine oxides, and the sulfur derivatives of these compounds. The number of carbon atoms in the molecule is determined for these compounds as well as for the amines by solubility considerations. Typical useful compounds are tributyl phosphate, trioctyl phosphine oxide, triphenyl phosphine oxide, octyl dioctylphosphinate, dodecyl didodecylphosphinate, naphthyl dinaphthylphosphinate, diphenyl phenylphosphonate, dioctyl butylphosphonate.

The concentration of the solvating ligand in the organic phase is not critical, although it must be great enough to provide two molecules of ligand per molecule of lithium to be extracted.

The lithium values may be removed from the organic phase by separating the organic and aqueous phases and contacting the separated organic phase with an acidic aqueous solution. Any mineral acid may be used, and the choice may be determined by the desire to avoid certain anions in the resulting lithium-containing aqueous phase. Typically useful acids are HCl, $HNO_3$, $H_2SO_4$, and $H_3PO_4$.

The acid concentration may be in the range to provide an aqueous solution having a pH of 0 to 2.

Having thus described my invention, the following examples are offered to illustrate it in more detail.

EXAMPLE I

An organic solution consisting of 0.18 molar dibenzoylmethane in 50 percent (by volume) tributyl phosphate-50 percent dodecane was sorbed onto polytetrafluoroethylene particles which were then placed in a column. A solution containing the alkali metal ions sodium, cesium, rubidium, potassium, and lithium was added to the column, forming a band at the top. This alkali metal band was then moved downwardly by passing a basic eluting solution (3.2 molar $NH_4OH$) through the column. After the heavier alkali metals were removed from the column, lithium was removed by eluting with 0.6 molar HCl. The elution curves obtained from the data are given in FIG. 1.

As can be seen from Example I, lithium is strongly complexed with this mixture of β-diketone and the organophosphorus compound.

Example II below illustrates a method of carrying out my invention by a conventional liquid-liquid extraction process.

EXAMPLE II

An aqueous solution 3 molar in $NH_4OH$ and containing 50 micromoles each of lithium, sodium, potassium, rubidium, and cesium, was thoroughly mixed with an equal volume of an organic phase consisting of 0.10 molar β-dibenzoylmethane-0.10 molar trioctyl phosphine oxide in dodecane. The organic and aqueous phases were then separated and the organic solution was contacted with an aqueous solution 0.6 molar in HCl. The organic, aqueous, and acid-stripping phases were analyzed. The distribution coefficients organic/aqueous and the separation factors were calculated and are given in the following table.

TABLE

| Alkali metal | Distribution coefficient, o./a. | Lithium separation factor |
|---|---|---|
| Lithium | 108 | |
| Sodium | 0.19 | 568 |
| Potassium | 0.0106 | 10,200 |
| Rubidium | 0.0100 | 10,800 |
| Cesium | 0.0087 | 12,400 |

The above examples are offered to illustrate, not to limit, my invention. It is obvious that changes may be made in the organic solvent, the chelating agent, the solvating ligand, the concentrations of organic constituents, and the content of the aqueous phase without departing from my invention.

I claim:
1. A method of separating lithium from an alkaline aqueous solution containing alkali earth metals comprising contacting said solution with a substantially water-insoluble phase containing (1) a chelating agent selected from β-diketones and analogs thereof wherein the oxygen atoms in the β-diketones have been replaced with nitrogen, phosphorus, or sulfur atoms and (2) a Lewis base solvating ligand which is more basic than water selected from the group consisting of amines and organophosphorus compounds represented by the formulas

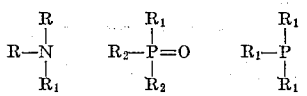

where R is selected from hydrogen, alkyl, and aryl radicals; $R_1$ is selected from alkyl and aryl radicals; and $R_2$ is selected from alkyl, aryl, alkoxy, and aralkoxy radicals, and sulfur analogs of alkoxy and aralkoxy radicals.

2. The method of claim 1 wherein said solvating ligand is an amine.

3. The method of claim 1 wherein said solvating ligand is an organophosphorus compound.

4. The method of claim 1 wherein said chelating agent is a β-diketone and said solvating ligand is selected from amines and organophosphorus compounds.

References Cited
UNITED STATES PATENTS

| | | | |
|---|---|---|---|
| 2,448,976 | 9/1948 | Heiligmann | 23—312 X |
| 2,533,246 | 12/1950 | Hayes | 23—89 |
| 2,726,138 | 12/1955 | Cunningham | 23—89 X |
| 3,278,260 | 10/1966 | Hermann | 23—312 X |
| 3,306,712 | 2/1967 | Goodenough | 23—312 |

FOREIGN PATENTS 405,880  9/1943  Italy.

OTHER REFERENCES

Kahlenberg, Amer. Chem. Soc. Journal, vol. 30 (1908), pp. 1104–1115.

West, Metallurgic Journal, 1951, vol. XLIII, No. 255, pp. 42–43.

NORMAN YUDKOFF, Primary Examiner

S. J. EMERY, Assistant Examiner

U.S. Cl. X.R.

23—89; 260—606.5, 607